Dec. 19, 1967 R. BENTO ETAL 3,359,504
INDUCTANCELESS FREQUENCY SELECTIVE SIGNAL
SYSTEM UTILIZING TRANSPORT DELAY
Filed March 25, 1964

WITNESSES:
John L. Chopp
James F. Young

INVENTORS
Robert Bento, Charles G. Brooks
and Irving F. Barditch
BY
ATTORNEY

United States Patent Office 3,359,504
Patented Dec. 19, 1967

3,359,504

INDUCTANCELESS FREQUENCY SELECTIVE SIGNAL SYSTEM UTILIZING TRANSPORT DELAY

Robert Bento and Irving F. Barditch, Baltimore, and Charles G. Brooks, Raspeburg, Md., assignors to Westinghouse Electric Corporation, East Pittsburgh, Pa., a corporation of Pennsylvania Filed Mar. 25, 1964, Ser. No. 354,539
1 Claim. (Cl. 330—38)

This invention relates to improvements in signal translation devices which can be used as bandpass filters, amplifiers, and oscillators. It is particularly directed to an inductanceless tunable signal translation device and system utilizing regenerative feedback to accomplish its end objective. Heretofore, tuned amplifiers have usually necessitated the use of tuning inductances but, as is well known in the art, there are certain limits to the minimum size to which inductances may be reduced and therefore this limits the upper signal frequency that can be handled by such devices. Also aside from the physical considerations, it is desirable to provide tuned amplifiers which can be miniaturized and molecularized. The use of resistance-capacitance phase shift networks, which are used in the present invention, is not ordinarily very feasible at the higher radio frequencies due to the impedance levels involved in building the networks; the values of stray and parasitic resistance and capacitance are such that the orders of magnitudes of the stray distributed RC become equal to those which are used to determine the circuit performance, with resulting disadvantages.

Also in prior tuned amplifiers utilizing distributed parameter phase shifting networks, there is an unfortunate tendency for the tuning of the system to drift as a result of ambient temperature and the heat of the system. The shortcomings of these prior devices are compounded when such stages are cascaded. This places a serious limitation on the design of IF amplifiers using such amplifier stages because of the staggered bandpass tuning. This also interferes with the desired independence of the stages. If these signal translation devices are to be miniaturized and molecularized it is preferable that, at least, several of these stages should be fabricated in a single monolith.

A primary object of the invention is to provide a novel and improved article of manufacture, a tuned amplifier utilizing a distributed parameter phase shifting network.

Another object is to provide a tuned amplifier utilizing distributed parameter phase shifting networks which will be simple, inexpensive, and easy to fabricate.

A further object is to provide a new and improved distributed parameter phase shift network in a tuned amplifier in which the phase shift in an active gain device, such as the phase shift in the base-to-collector capacitance of a junction type transistor, is added to the phase shift in a passive device such as a distributed resistance-capacitance network to provide a positive feedback for a selected band of frequencies.

The invention itself, however, both as to its organization and method of operation as well as additional objects and advantages will best be understood from the following description when read in connection with the accompanying drawing, in which.

Figure 1:
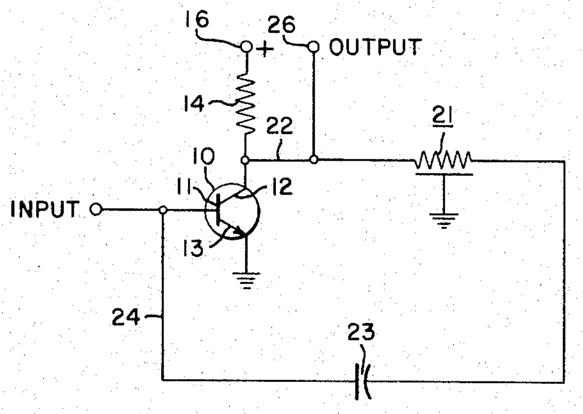
FIGURE 1 is a circuit diagram of one embodiment of the present invention.

Briefly speaking, the present invention provides a grounded-emitter transistor stage, the output of which is coupled to a distributed resistance-capacitance network with the output of the latter coupled to the input in order to provide a frequency selective signal translation system. Dependent upon the amount of coupling between the output and the input, which in turn may be dependent upon the characteristics of the particular transistor, as well as upon the distributed parameter phase shifting network, the device may be operated as a filter, an amplifier, or an oscillator. The feedback coupling determines the manner of operation. The grounded emitter type of transistor shifts the phase of all of the frequencies of the input signal 180° and in additional to this, there is an excess phase shift at certain frequencies, dependent upon the inherent distributed resistance-capacitance circuit equivalent of the base-collector junction of the transistor, and when this phase shift at the selected band of frequencies is combined with the phase shift of an external component such as that illustrated, a bandpass characteristic for the selected band of frequencies is produced. It will be readily apparent that the transistor component as well as the additional phase shifting component may be made as individual components or they may be molecularized into a single monolithic unit. The special article of manufacture illustrated in the drawing overcomes the disadvantages of the prior art outlined above.

For stability of operation of the present signal translation system it is essential that the feedback coupling be as nearly as possible completely isolated from the effects of temperature changes in the transistor and the phase shifting components of the system. It is also desirable that the relative movement between the components and leads be minimized. The heat sink unit construction of the present invention accomplishes these objectives.

Referring to FIG. 1, a grounded emitter transistor 10 having a base 11, a collector 12, and an emitter 13 serves as the positive gain device of the system of the present invention. In a conventional manner the collector 12 is connected through the dropping resistor 14 to a source of DC potential represented by the terminal 16. It is common to refer to signals as having a single frequency, meaning inferentially a line spectrum, but in actual practice signal energy is carried in a spectrum of frequencies and it is by reason of this that the device of the present type acquires its selective characteristics. In any distributed RC network the radius vector of the various components of the signal of different frequencies varies in one direction as regards amplitude while at the same time the phase of this radius vector rotates in a given direction. This means that it is then possible with the proper parameters to have a certain frequency band at which the radius vectors of one band of frequencies at the input terminals are equal and opposite to that same band of frequencies at the output terminal.

To this end, the present invention contemplates the combination of a filter network in the form of a distributed resistance-capacitance 21 connected by lead 22 to the collector 12 and capacitively coupled through a suitable capacitor 23 and lead 24 to the base 11 which constitutes the input to the system. The distributed RC network 21, the capacitor 23, and the lead 24 constitutes a feedback loop between the collector and base of the transistor 10. There is a 180° electrical phase shift between all the frequency components at the input and at the output of the transistor 10. In addition the transistor constitutes an equivalent distributed RC network that produces "excess phase shift," of different amounts for different frequency components. The so-called "excess phase shift" that takes place in a transistor is due to transit time of the carriers from the emitter to the collector and is explained in "Semiconductor Networks Analysis and Design," published by McGraw-Hill in 1964, at pages 34–38, 106–110 and 141–256. The RC network 21 has a low pass frequency response characteristic and its parameters are so selected as to provide additional phase shift to a selected frequency band as to give a total 360° phase shift resulting in regenerative feedback at the selected frequency band. The output signal at the output terminal 26 comprises a selected band of frequencies which pass through the feedback loop with the proper phase shift so that they are in regenerative phase with the selected frequency components of the input signal at the input of the device.

Figure 2:
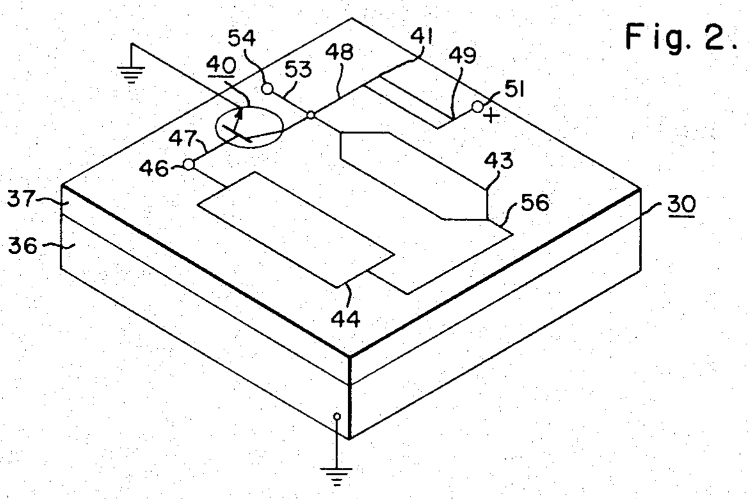
FIG. 2 is an isometric view of a molecularized version of the first embodiment of the invention.

The illustrative embodiment of the invention, shown in FIG. 2, and utilizing the circuit configuration of FIG. 1 comprises a unit 30 as a new article of manufacture in the form of an inductanceless bandpass signal translation system so fabricated as to substantially reduce or eliminate the heat sink problem. The signal translation unit 30 may comprise a suitable conducting block 36 af aluminum which has been covered by a thick layer of oxide, such as the film 37, by an anodizing process. Alternatively, the unit 30 may comprise a semiconductor wafer on which a suitable oxide is formed. The block serves as the substrate for mounting a transistor 40 which corresponds to the transistor 10 of FIG. 1. In the end product assembly the block substrate 36 will usually be in good electrical and good thermal conducting relation with an assembly frame (not shown) which would constitute the electrical ground and the heat dissipating unit.

An electrically-conducting thin strip of resistive material 41 is electroplated or evaporated onto the upper surface of the oxide film 37 which constitutes a resistor corresponding to the resistor 14 of the circuit diagram of FIG. 1. Obviously the value of the resistor can be controlled by its dimensions. A thin film of resistive material 43 constitutes a distributed resistor and, in conjunction with the oxide film 37 and the conducting substrate 36, forms a distributed RC network which constitutes a low pass filter corresponding to the low pass filter 21 of FIG. 1. An overlap capacitor 44, corresponding to the capacitor 23 of FIG. 1, completes the components of the system.

The so-called "overlap" capacitor is merely two conductive plates separated by a suitable thin dielectric film and could be fabricated in a manner well known in the art.

The components of the illustrated embodiment are connected in a circuit configuration similar to that of FIG. 1. To this end, input terminal 46 is an ohmic contact on a suitable lead 47 which connects one side of the overlap capacitor 44 to the base of the transistor 40. The lead 47 may be in the form of a deposited thin conductive strip, fabricated in accordance with known techniques. A similar lead 48 connects the collector of the transistor 40 to the strip of resistive material 41 and another similar conducting lead 49 connects the other end of resistor 41 to an ohmic contact 51, corresponding to terminal 16 of FIG. 1, through which the transistor 40 is energized by a source of DC potential, not shown. The collector of the transistor 40 is connected through a suitable lead 53 to an ohmic contact 54 which constitutes the output terminal. Lead 53 also connects to one end of the distributed RC component 43 and lead 56 connects the other end of component 43 to the capacitor 44.

In a unit fabricated in accordance with the present invention, the alumina or $SiO_2$ film 37 is so thin that heat from the transistor 40 and the other components of the circuit are transferred readily to the aluminum or semiconductor substrate 36, thus minimizing the effect of the heat from the components and any sudden changes in ambient temperature upon the tuning of the system.

In accordance with the invention, all of the components of the signal translation system are in good heat transfer relation with the grounded conducting substrate 36 whether it is aluminum or a semiconductor so doped as to be a good conductor. The strip resistor 41 and the distributed resistor 43 may be made of nichrome deposited on either a glass or quartz insulating layer where a metal plate such as an aluminum or copper plate is used as the grounded substrate. An amplifier of the type described, using a phase shift distributed RC network comprising a nichrome plate on a glass film performed quite satisfactorily in the region of six megacycles.

Where a metal plate substrate, such as aluminum with the alumina or silicon dioxide insulating layer are used the components and the connecting leads may be adhered to the oxide insulating layer by means of an epoxy bonding agent. Where a monolithic semiconductor unit is desired, the semiconductor substrate is fabricated by heavy doping of the underside to make it conducting. An ohmic contact may be provided if desired for electrical bonding to ground. In this instance the transistor 40 is fabricated into the block in accordance with techniques known in the art. The resistors and the capacitors are also fabricated into the monolithic unit by known masking, etching and doping techniques.

In either case the unit 30 serves as a heat sink and at the same time the stray capacitances between the components and leads are controlled and utilized as part of the overall parameters of the system. Whereas these stray capacitances have been generally considered undesirable in the prior art because they vary as a direct result of temperature changes and as a result of slight relative movement due to temperature changes as well as that due to other environmental conditions, the unit construction of the present invention eliminates relative movement and at the same time provides a heat sink particularly advantageous in this type of signal translation device.

A bandpass filter such as that constituted by the distributed RC networks described herein is commonly called a negative gain device. Since a grounded emitter transistor is a positive gain device reference will be made in the claims to a type of system incorporating these basic elements.

It will be readily apparent to those skilled in the art that the invention is not limited to the exact details shown and illustrated but is susceptible of various changes and modifications without departing from the spirit of the invention.

We claim as our invention:

A new article of manufacture constituting a frequency-selective signal translation system of the type in which a grounded emitter transistor has a phase-shifting device connected between the collector and the base of said transistor to produce a total of 360° phase shift and regenerative feedback for a selected band of frequencies, said article comprising an electrically-conductive and thermally-conductive substrate, and electrically-insulating, thermally-conductive layer in contiguous thermally-conductive relation with said substrate, a transistor amplifier fabricated within said layer and having a base, collector and an emitter connected in a grounded emitter configuration, a distributed RC network having two members including said substrate and a distributed resistance member integrally and rigidly fabricated with said insulating layer and said substrate to form a unitary body, said resistance member and said substrate constituting a distributed capacitance, said resistance member being connected in an alternating current feedback circuit between said collector and said base of said transistor and said resistance having characteristics such as to oppose the changes in gain of said transistor due to temperature changes.

(References on following page)

References Cited

UNITED STATES PATENTS

| | | |
|---|---|---|
| 2,816,228 | 12/1957 | Johnson. |
| 3,165,708 | 1/1965 | Stelmak et al. |
| 3,170,126 | 2/1965 | Bento et al. |
| 3,212,020 | 10/1965 | Donovan et al. |

OTHER REFERENCES

Hager, "Network Design of Microcircuits," Electronics, Sept. 4, 1959, vol. 32, No. 36, pages 44–49. Copy available in Scientific Library or 330–38.

Kaufman, "Theory of a Monolithic Null Device and Some Novel Circuits," Proc. of IRE, September 1960, vol. 48, pages 1540–1545. Copy available in Scientific Library and 330–38.

Yanai et al., "Integrated-Circuit Oscillator . . . ," Electronics, Dec. 13, 1963, page 40. Copy available in Scientific Library or 307–88.5–21.3.

ROY LAKE, *Primary Examiner.*

N. KAUFMAN, F. D. PARIS, *Examiners.*